(12) United States Patent
Thompson et al.

(10) Patent No.: US 7,442,304 B1
(45) Date of Patent: Oct. 28, 2008

(54) IN-SITU BALLAST WATER TREATMENT METHOD

(75) Inventors: Claude R. Thompson, Virginia Beach, VA (US); William M. Lechler, Virginia Beach, VA (US); Neil F. Marshall, Williamsburg, VA (US)

(73) Assignee: Sea Knight, LLC, Virginia Beach, VA (US)

( * ) Notice: Subject to any disclaimer, the term of this patent is extended or adjusted under 35 U.S.C. 154(b) by 15 days.

(21) Appl. No.: 11/786,691

(22) Filed: Apr. 12, 2007

(51) Int. Cl.
*C02F 3/00* (2006.01)

(52) U.S. Cl. ........................................ 210/603; 210/620

(58) Field of Classification Search .............. 210/242.2, 210/620, 603
See application file for complete search history.

(56) References Cited

U.S. PATENT DOCUMENTS

| | | | |
|---|---|---|---|
| 6,342,159 B1 * | 1/2002 | Caplan et al. | 210/610 |
| 6,436,289 B1 * | 8/2002 | Johnstone | 210/620 |
| 6,722,933 B2 | 4/2004 | Hunter | |

* cited by examiner

*Primary Examiner*—Chester T Barry
(74) *Attorney, Agent, or Firm*—Peter J. Van Bergen

(57) ABSTRACT

A method and system for ballast water treatment are provided. Living organisms are added into a vessel's ballast water tank (e.g., via an existing vent) to consume (i) oxygen dissolved in ballast water contained in the ballast water tank, and (ii) food sources for selected organisms contained in the ballast water.

9 Claims, 5 Drawing Sheets

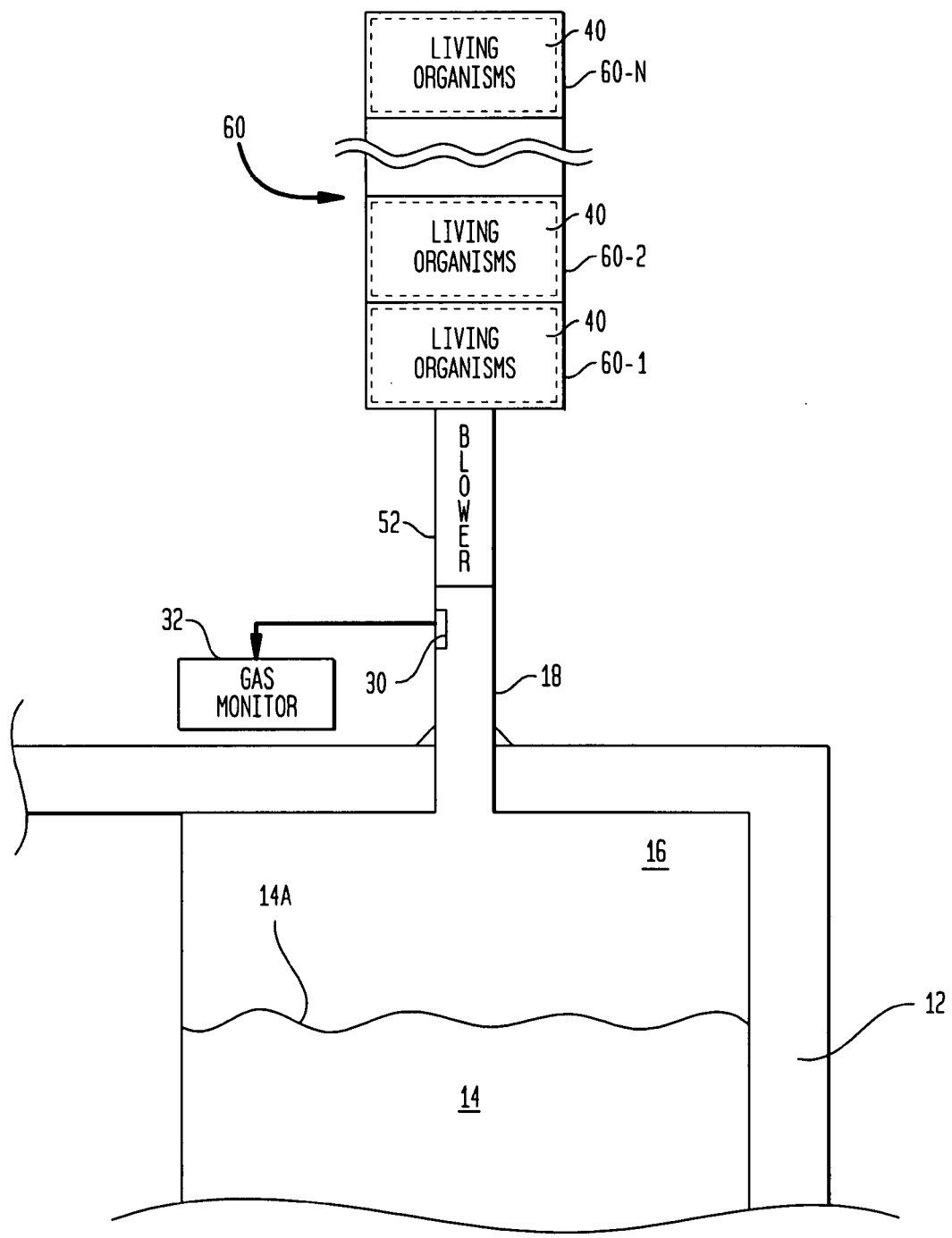

IN-SITU BALLAST WATER TREATMENT METHOD

CROSS-REFERENCE TO RELATED PATENT APPLICATIONS

This patent application is co-pending with one related patent application entitled "IN-SITU" BALLAST WATER TREATMENT SYSTEM AND METHOD", Ser. No. 11/712,795, filed Mar. 1, 2007, by the same inventors and owned by the same assignee as this patent application.

FIELD OF THE INVENTION

The invention relates generally to the treatment of ballast water, and more particularly to a method and system for treating ballast water "in-situ" in ballast tanks of ocean-going vessels in order to control or eliminate various species of micro-organisms that could be harmful if released into a surrounding environment.

BACKGROUND OF THE INVENTION

Non-indigenous, nuisance and/or harmful species of aquatic micro-organisms are discharged into territorial waters by means of ballast water carried by ships from foreign ports. These micro-organisms are predominantly aerobic organisms that require oxygen throughout their life cycle, (i.e., first as larvae, then as plankton, finally as a mature organism). These aerobic micro-organisms obtain the necessary oxygen from "dissolved" atmospheric air present in the seawater contained in a vessel's ballast tanks. Dissolved air in seawater contains all the constituent gases present in the earth's atmosphere (including oxygen) that are not chemically bonded to the atomic elements of water. Therefore, the dissolved oxygen in seawater is freely available to sustain aquatic life.

In an effort to eliminate dissolved oxygen in a vessel's ballast water, U.S. Pat. No. 6,722,933 discloses a closed loop system that depressurizes a ballast tank's ullage space while simultaneously introducing oxygen-depleted gas into the ballast water. However, this system requires expensive modifications to the ballast tank.

SUMMARY OF THE INVENTION

Accordingly, it is an object of the present invention to provide a method and system for ballast water treatment.

Another object of the present invention is to provide an "in-situ" ballast water treatment method and system that eliminates harmful and/or nuisance species of aquatic micro-organisms in a vessel's ballast water.

Still another object of the present invention is to provide an effective ballast water treatment method and system that requires no ballast tank modifications.

Other objects and advantages of the present invention will become more obvious hereinafter in the specification and drawings.

In accordance with the present invention, a method of ballast water treatment adds living organisms into a vessel's ballast water tank to consume (i) oxygen dissolved in ballast water contained in the ballast water tank, and (ii) food sources for selected organisms contained in the ballast water. In a preferred embodiment, the living organisms are introduced under a positive pressure into an existing vent of the ballast water tank so that they are dispersed across a surface of the ballast water.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 6 is a schematic view of a ballast water tank equipped with another embodiment of the ballast water treatment system that provides for the addition of multiple doses of living organisms via an existing vent of the ballast water tank.

DETAILED DESCRIPTION OF THE INVENTION

Figure 1:
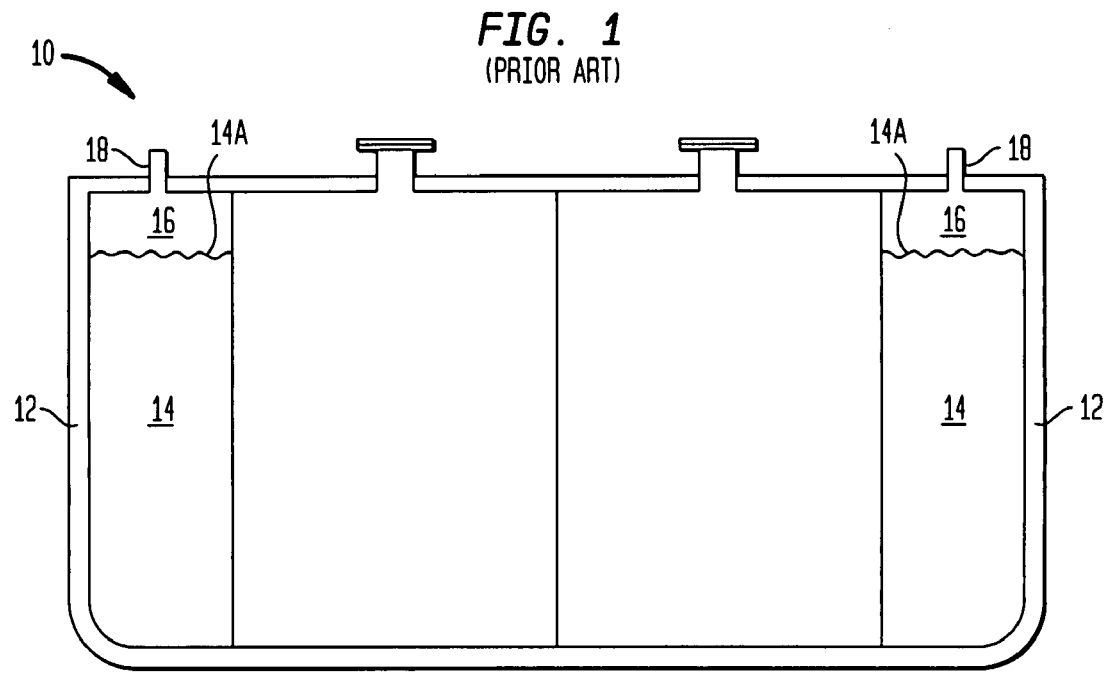
FIG. 1 is a schematic view of a conventional ballast water tank on an ocean-going vessel.

Referring now to the drawings and more particularly to FIG. 1, a portion of an ocean-going vessel 10 (e.g., ship, barge, etc.) is shown. More specifically, the vessel's conventional ballast water tank 12 is shown. The shape and size of ballast water tank 12 are not limitations of the present invention. In addition, the number of such ballast water tanks in vessel 10 is not a limitation of the present invention. The essential features and functions of ballast water tank 12 are well known in the art. Briefly and in general, when vessel 10 is operational, ballast water tank 12 is filled with ballast water 14 to a desired level in tank 12. The air space in ballast water tank 12 above the surface 14A of ballast water 14 is known as ullage space 16. A vent 18 in communication with ullage space 16 allows gases in ullage space 16 to be released into the surrounding atmosphere. It is to be understood that the term "ullage space" as used herein is not limited to the scenario illustrated in FIG. 1. That is, if the ballast water tank is completely filled with ballast water, the ullage space could be defined by the air space in the ballast water tank's vent(s).

The present invention is a system and method for eliminating a variety of harmful/nuisance micro-organisms (not shown) naturally present in ballast water 14. In general, the harmful/nuisance micro-organisms of concern are those that are indigenous to the environment where ballast water 14 originated (i.e., where vessel 10 began its voyage), but non-indigenous to the environment where ballast water 14 will be discharged (i.e., where vessel 10 terminates its voyage). Furthermore, the harmful/nuisance micro-organisms of concern are typically aerobic in nature so that they require the presence of dissolved oxygen in ballast water 14 as well as the presence of other organisms that are food sources. Accordingly, for the remainder of this description, the harmful/nuisance micro-organisms will be referred to as aerobic micro-organisms. The particular aerobic micro-organisms and their food sources will vary depending on the geographic origin of ballast water 14. Further, the level of environmental impact associated with a particular aerobic micro-organism can be related to the geographic region where ballast water 14 will be discharged. Accordingly, the following description of the present invention will not be directed to any particular aerobic micro-organism. Indeed, a great advantage of the present invention is its ability to be adapted to the treatment of any ballast water regardless of its origin.

Figure 2:
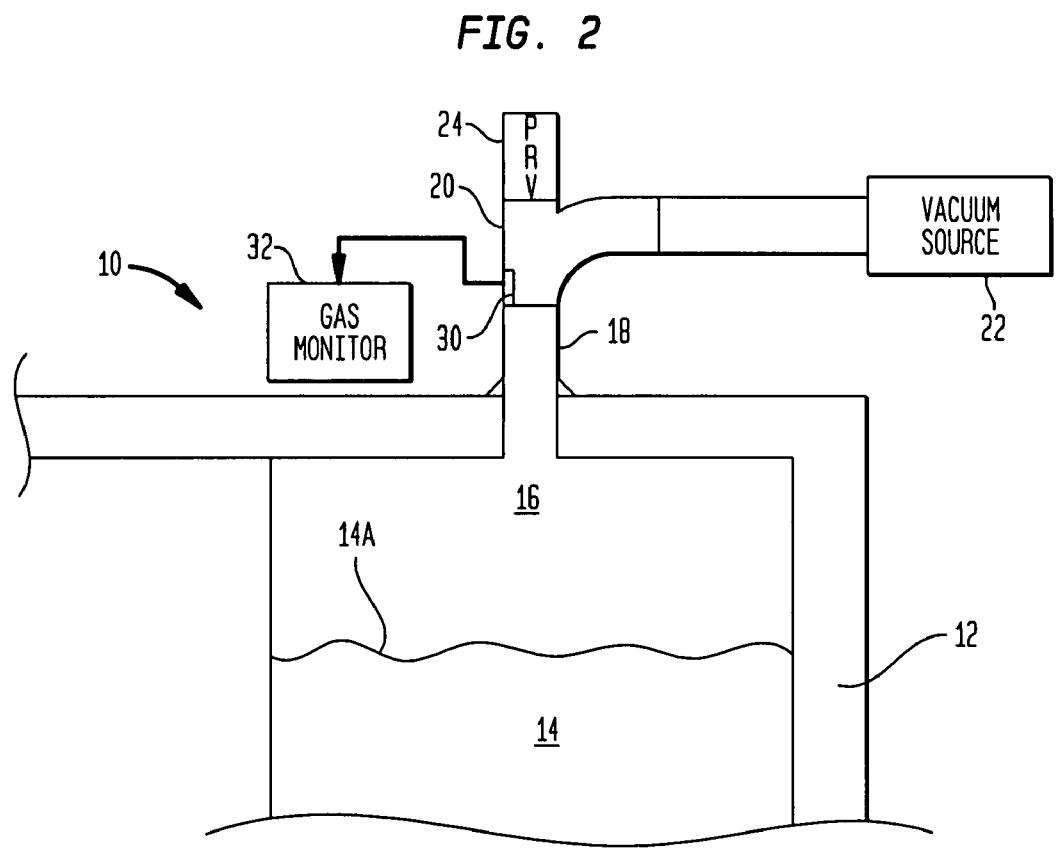
FIG. 2 is a schematic view of a ballast water tank equipped with a ballast water treatment system in accordance with an embodiment of present invention.

Referring now to FIG. 2, an embodiment of an "in-situ" ballast water treatment system of the present invention is shown coupled to ballast water tank 12. In general, the present invention is easily installed on the existing vent 18 of ballast water tank 12. That is, no modifications to ballast water tank 12 are required, while only minimal or no modification to existing vent 18 is required. More specifically, a Y-adapter housing 20 is coupled to the outside or upper end of vent 18. Such coupling can be permanent in fashion (e.g., welded or otherwise adhered) or removable in fashion (e.g., threaded, snap-fit, wedge-fit, etc.) without departing from the scope of the present invention. Housing 20 defines two flow paths therethrough. The first flow path is coupled to a vacuum source 22 that, when activated, will generate a vacuum pressure in vent 18/ullage space 16. The second flow path incorporates a pressure relief valve (i.e., designated as "PRV" in FIG. 2) 24 configured to remain closed up to a specified pressure and then open once that pressure is exceeded.

For purposes of the treatment of ballast water 14, vacuum source 22 and pressure relief valve 24 cooperate to apply a low-level vacuum pressure to vent 18/ullage space 16 during the course of a voyage of vessel 10. The low-level vacuum in the range of approximately −2 to −4 pounds per square inch functions to (i) draw gases out of ullage space 16, and (ii) over extended periods associated with the voyage of vessel 10, draw dissolved oxygen from ballast water 14. As a result, the aerobic micro-organisms typically present in ballast water 14 slowly die as their dissolved oxygen source is reduced or eliminated by the low-level vacuum. By the completion of the voyage of vessel 10, the goal of the present invention is that the depleted-oxygen ballast water 14 is completely or substantially free of the unwanted aerobic micro-organisms. Note that some of the aerobic micro-organisms may be facultative in that they can also exist anaerobically. However, such anaerobic micro-organisms will be killed when the ballast water is discharged into a water environment that is relatively oxygen-rich.

The presence of pressure relief valve 24 regulates the vacuum pressure in vent 18/ullage space 16 as it is set to open when a desired vacuum pressure from the afore-mentioned range is reached or exceeded. The low-level vacuum pressure assured by pressure relief valve 24 also guarantees the structural integrity of ballast water tank 12. Thus, the present invention treats ballast water 14 "in-situ" without requiring any modifications to ballast water tank 12.

The present invention can also include the means to monitor the types of gases present in vent 18/ullage space 16. Accordingly, housing 20 can incorporate one or more sensor(s) 30 sensitive to one or more gases of interest or concern. Sensor(s) 30 would typically be coupled to a gas monitor 32 that can be used to trigger an alarm (e.g., audible, visual, etc.) when the level of the one or more gases being sensed does not meet acceptable criteria.

The method and system of the present invention can be further improved by introducing environmentally-safe living organisms into ballast water 14 that consume oxygen and the food sources of the aerobic micro-organisms in ballast water 14. By removing the aerobic micro-organisms' oxygen and food, the undesirable aerobic micro-organisms will die of suffocation and/or starvation. When the addition of such living organisms is combined with the above-described low-level vacuum, a novel two-pronged "in-situ" approach to ballast water treatment is achieved.

The living organisms that are to be added to the ballast water can be selected to consume oxygen and the aerobic micro-organisms' food sources, and could further be selected to consume the aerobic micro-organisms that have died. The living organisms added to ballast water 14 could be a mix or "cocktail" of different types of living organisms to combat different types of unwanted aerobic micro-organisms in ballast water 14. The particular type(s) of living organisms selected will depend on the type of aerobic micro-organisms present in ballast water 14 as well as the ecosystem in which "treated" ballast water 14 will be discharged. That is, the selected living organisms should be environmentally safe for the ecosystem receiving the discharged/treated ballast water. Such selection would be understood by those skilled in the art and is not a limitation of the present invention.

Figure 3:
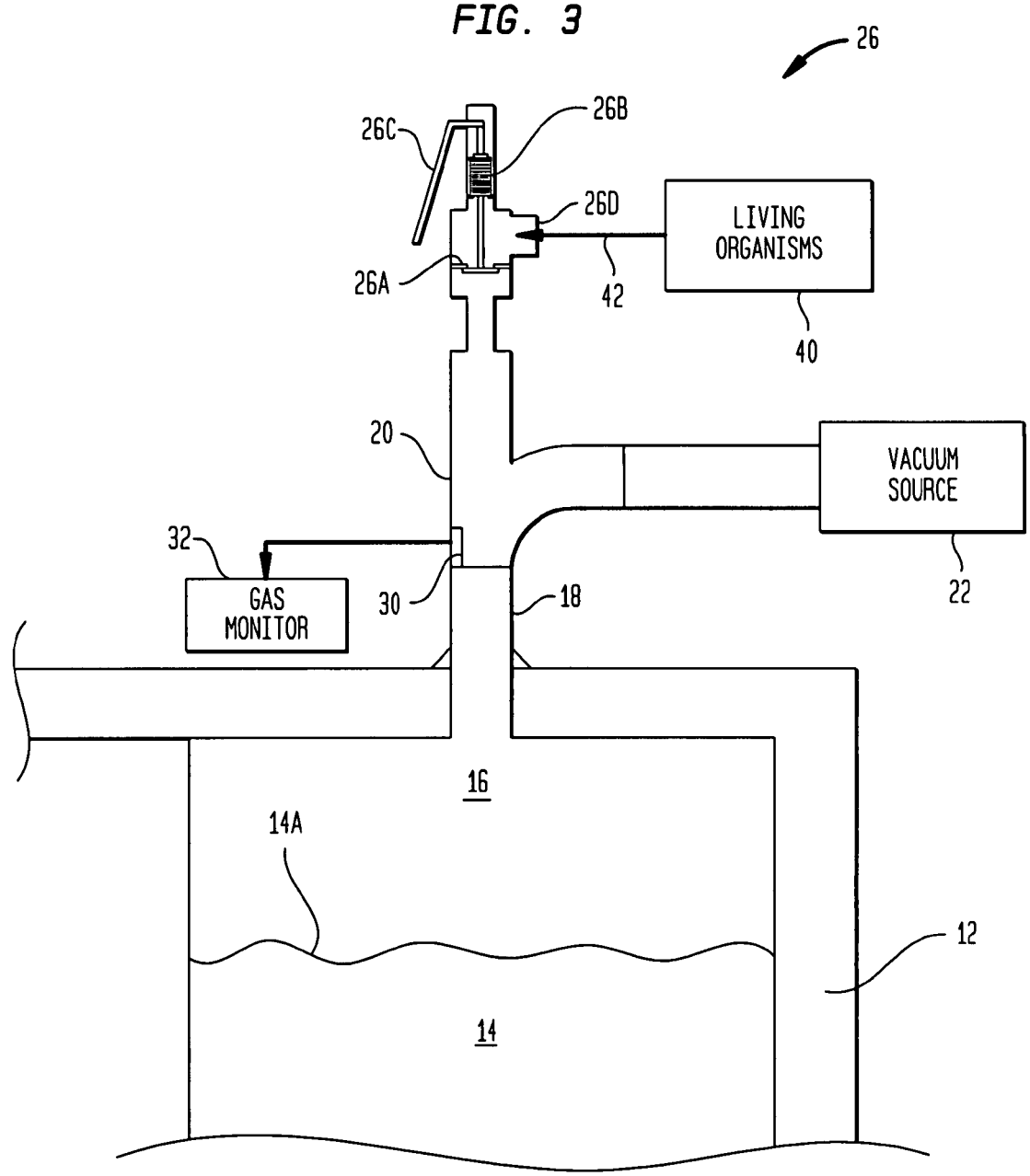
FIG. 3 is a schematic view of a ballast water tank equipped with a ballast water treatment system in accordance with another embodiment of the present invention.

Referring now to FIG. 3, an embodiment of an "in-situ" ballast water treatment system embodying the above-described two-pronged approach is illustrated. The previously-described elements are illustrated, but will not be described again. Also, note that the sensor(s) 30 and gas monitor 32 can be provided as shown, but are not required for the two-pronged water treatment approach.

In FIG. 3, the present invention includes a pressure relief valve 26 that can be opened on demand when vacuum pressure is being applied by vacuum source 20. In the illustrated example, pressure relief valve 26 has a valve seat arrangement 26A, a spring-loaded shaft 26B coupled to seat arrangement 26A, an actuator 26C coupled to shaft 26B, and a valve port 26D formed therein at a location outboard of seat arrangement 26A. In operation, the spring force provided by shaft 26B will be automatically overcome when the vacuum pressure (on the side of seat arrangement 26A facing vent 18) exceeds the desired low-level vacuum pressure. At this point, vent 18/ullage space 16 are vented to the atmosphere via valve port 26D thereby allowing the vacuum pressure in vent 18/ullage space 16 to be decreased in order to maintain and assure the tank's structural integrity.

The opening of pressure relief valve 26 is accomplished by lifting up on actuator 26C to thereby open seat arrangement 26A. The lifting force applied to actuator 26C can be a manually-applied force (i.e., by an on-site operator) or a mechanically-applied force provided by an automated system (not shown). For the purpose of ballast water treatment, the above-described living organisms 40 are added to ballast water 14 via valve port 26D as referenced by arrow 42 when valve 26 is opened. More specifically, while vacuum source 20 is activated, valve 26 is opened. As a result, air at atmospheric pressure will flow through opened seat arrangement 26A, through housing 20/vent 18, and into ullage space 16. When living organisms 40 are added at this time, they will be distributed over the surface 14A of ballast water 14. This will assure wide coverage of the added living organisms over surface 14A and, ultimately, through ballast water 14 as the living organisms sink therein. If needed, distribution diverters or vanes (not shown) can be installed in vent 18 to further assist with the distribution of living organisms 40 over surface 14A. Furthermore, just as an automated system can be used to control the on-demand opening of valve 26, the dispensing of living organisms 40 through valve port 26D could also be automated. Indeed, the opening of valve 26 and simultaneous dispensing of living organisms 40 could be coordinated by a single automated system. In all cases, once the living organisms are added, valve 26 is allowed to close and assume its normal automatic "pressure relief" function.

The oxygen and food-source-consuming living organisms can be added one or more times (as needed) after ballast water 14 is in ballast water tank 12. That is, some applications might only require a one-time addition of the living organisms, while other applications might require multiple or periodic additions of the living organisms. Further, other applications might require different living organisms to be added at different times. Accordingly, the frequency with which the living organisms must be added is not a limitation of the present invention.

Figure 4:
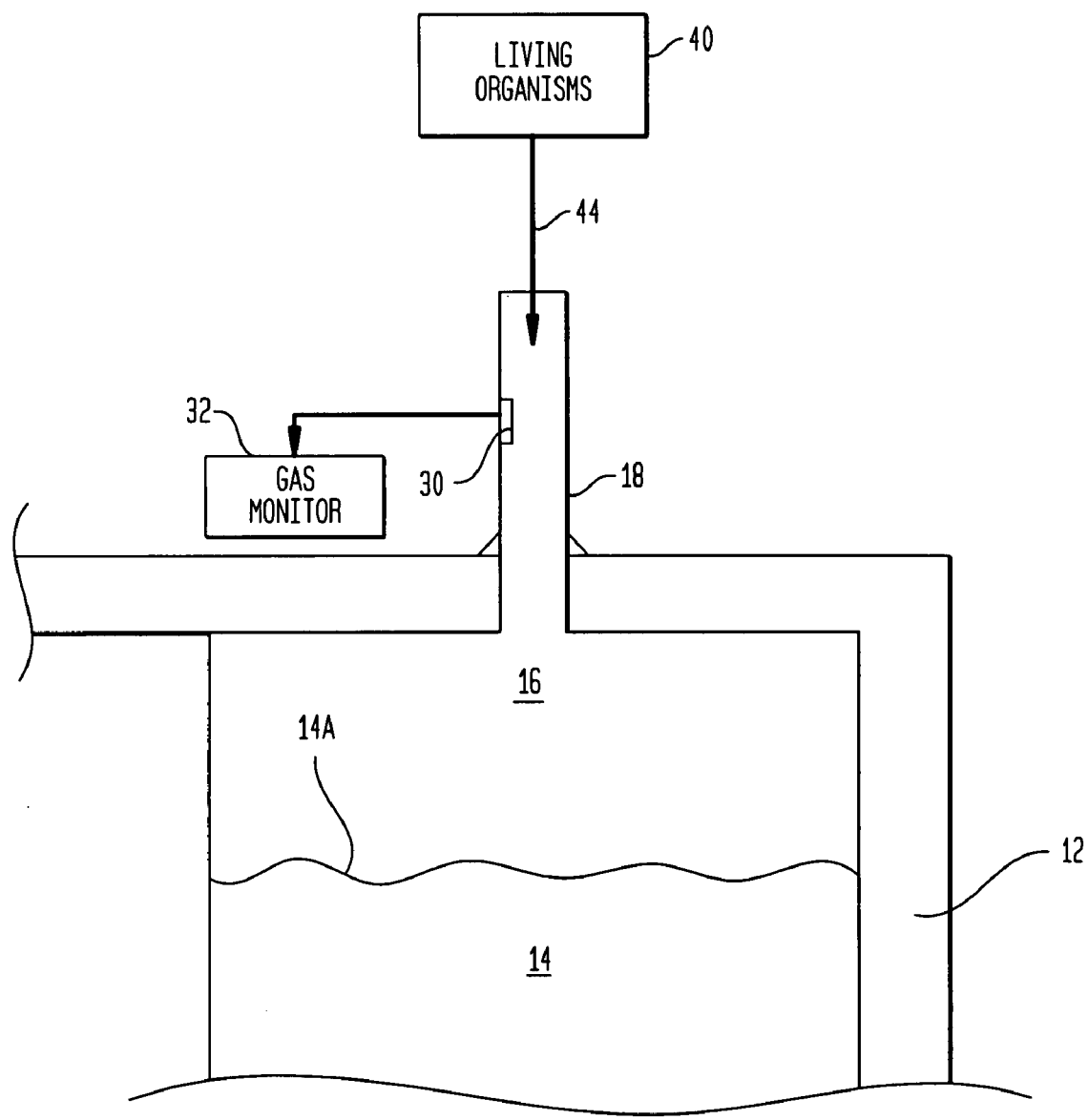
FIG. 4 is a schematic view of a ballast water tank equipped with a ballast water treatment system in accordance with still another embodiment of present invention that relies only the addition of living organisms.

"In-situ" ballast water treatment in accordance with the present invention could also be accomplished by just adding the above-described environmentally-safe living organisms into the ballast water to consume oxygen and the food sources of the aerobic micro-organisms in the ballast water. The addition of the living organisms could be accomplished in a variety of ways without departing from the scope of the present invention. For example, as shown in FIG. 4, living organisms 40 could be added (as referenced by arrow 44) through an existing vent 18 using a variety of techniques/apparatus ranging from the simple manual addition of living organisms 40 to an automated dispensing system (not shown) therefor. The previously-described elements are referenced by the same reference numerals, but will not be described again. Also, note that the sensor(s) 30 and gas monitor 32 can be provided as shown, but are not required for this embodiment/approach.

Figure 5:
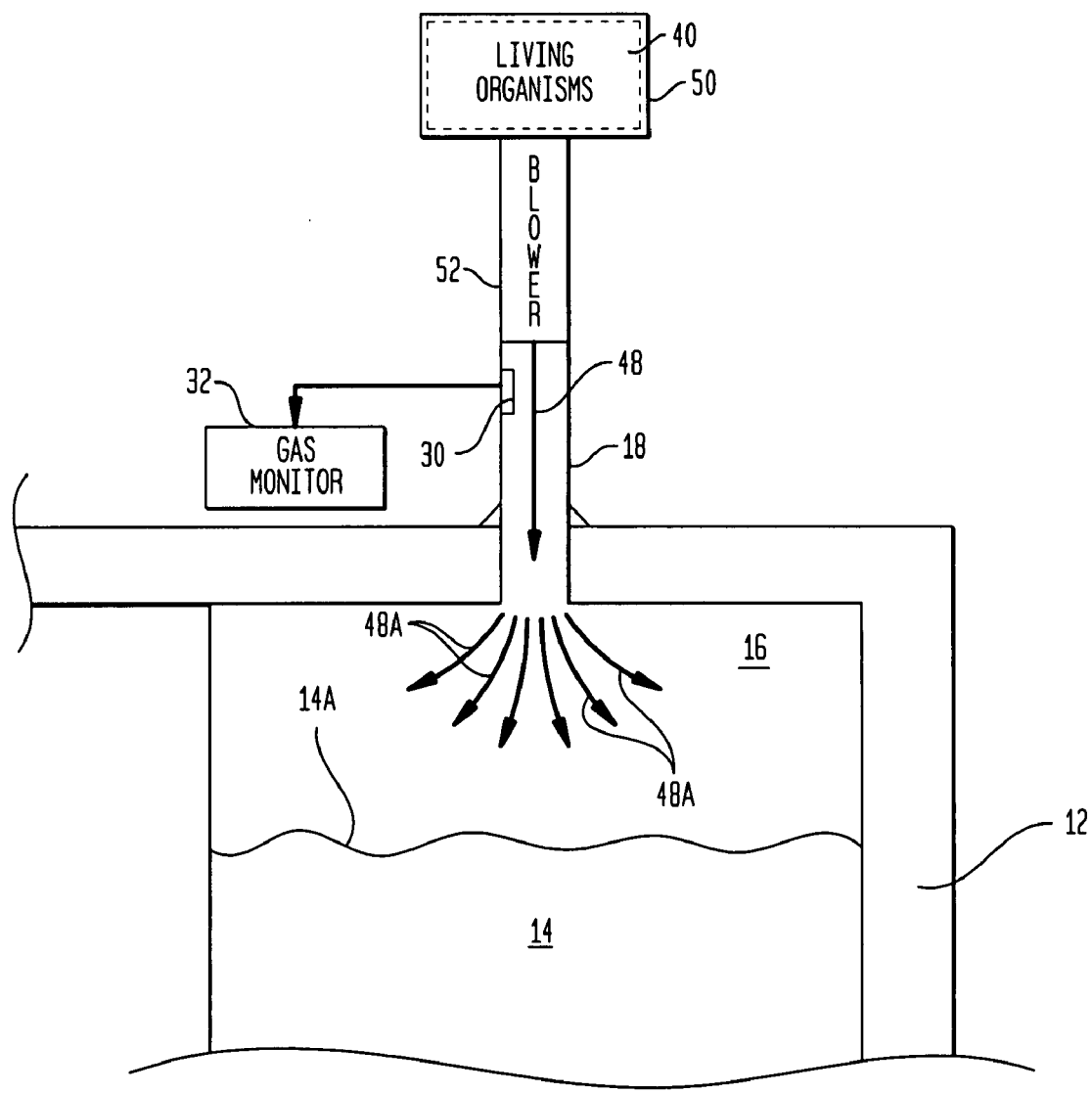
FIG. 5 is a schematic view of a ballast water tank equipped with another embodiment of the ballast water treatment system that relies only the addition of living organisms where the treatment system is coupled to an existing vent of the ballast water tank.

Referring now to FIG. 5, a simple mechanized means is illustrated for adding living organisms 40 in a way that provides for the dispersement thereof over the surface 14A of ballast water 14. In this exemplary embodiment, a housing or container 50 holds a store of living organisms 40. A blower 52 is coupled to vent 18 (e.g., welded, adhered, threaded, snap-fit, etc.) and coupled to housing 50. In operation, when living organisms 40 are to be added to vent 18, living organisms 40 are permitted to enter blower 52. Blower 52 is configured to apply a positive air pressure at the entrance to vent 18 so that living organisms 40 admitted into blower 52 are blown into vent 18 as referenced by arrow 48. As a result of the positive pressurization provided by blower 52, living organisms 40 will disperse over the surface 14A of ballast water 14 (as indicated by arrows 48A) as they enter the larger-volume ullage space 16 from the smaller-volume vent 18. Admittance of living organisms 40 into blower 52 can be manually controlled or autonomously controlled without departing from the scope of the present invention.

As mentioned above, the living organisms could be added at several different times. Accordingly, FIG. 6 illustrates another embodiment of the present invention in which a housing or container 60 is configured to store a number of measured doses of living organisms 40. For example, container 60 has a number of container sections 60-1, 60-2, . . . , 160-N, each of which holds a dose of living organisms 40. As is the previous embodiment, blower 52 is used to blow each admitted dose of living organisms 40 into vent 18 and disperse same over the surface 14A of ballast water 14.

The advantages of the present invention are numerous. The ballast water treatment approaches described herein do not require any modifications to a vessel's ballast water tank. No bulky holding or treatment tanks are required as the ballast water is treated "in-situ". All system components are easily coupled to the ballast water tank's existing vent. Thus, the present invention provides simple, inexpensive and effective ballast water treatment approaches that can be readily adopted by the shipping industry.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of ballast water treatment, comprising the steps of:
   adding living organisms into a vessel's ballast water tank to consume (i) oxygen dissolved in ballast water contained in the ballast water tank, and (ii) food sources for selected organisms contained in the ballast water; and
   applying a vacuum directly to an existing vent of the ballast water tank during the vessel's voyage, said vacuum being in a range of approximately −2 to −4 pounds per square inch.

2. A method according to claim 1 wherein said step of adding comprises the step of adding said living organisms into the ballast water tank via an existing vent thereof.

3. A method according to claim 1 wherein said step of adding comprises the step of dispersing said living organisms across a surface of the ballast water.

4. A method according to claim 1 wherein said step of adding comprises the step of dispersing said living organisms across a surface of the ballast water from an existing vent of the ballast water tank.

5. A method according to claim 1 wherein said step of adding is carried out at least one time after the ballast water tank is filled with the ballast water.

6. A method according to claim 1 wherein the selected organisms are aerobic organisms.

7. A method according to claim 1 wherein said living organisms are selected to be harmless to an ecosystem in which the ballast water is to be discharged.

8. A method according to claim 1 wherein said step of applying includes the step of regulating said vacuum.

9. A method according to claim 2 further comprising the steps of:
   monitoring a level of at least one gas in the existing vent; and
   generating an alarm signal when said level is indicative of an unacceptable amount of said at least one gas.

* * * * *